United States Patent
Yeo et al.

(10) Patent No.: US 7,369,343 B1
(45) Date of Patent: May 6, 2008

(54) DISK DRIVE CORRECTING TRACK ADDRESS DURING A WRITE OPERATION

(75) Inventors: Teik E E Yeo, Trabuco Canyon, CA (US); Weiping Chen Jiang, Laguna Niguel, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 84 days.

(21) Appl. No.: 11/494,242

(22) Filed: Jul. 27, 2006

(51) Int. Cl.
*G11B 15/04* (2006.01)
*G11B 5/09* (2006.01)

(52) U.S. Cl. .......................... 360/60; 360/49
(58) Field of Classification Search ................ None
See application file for complete search history.

(56) References Cited

U.S. PATENT DOCUMENTS

| | | | |
|---|---|---|---|
| 5,392,302 A | 2/1995 | Kemp et al. | |
| 5,661,760 A * | 8/1997 | Patapoutian et al. | 375/341 |
| 5,914,830 A | 6/1999 | Kadlec et al. | |
| 5,961,658 A | 10/1999 | Reed et al. | |
| 5,982,308 A | 11/1999 | Bang | |
| 6,034,829 A | 3/2000 | Suzuki et al. | |
| 6,185,173 B1 | 2/2001 | Livingston et al. | |
| 6,201,652 B1 | 3/2001 | Rezzi et al. | |
| 6,392,831 B1 | 5/2002 | Yeo et al. | |
| 6,516,443 B1 | 2/2003 | Zook | |
| 6,587,987 B1 | 7/2003 | Vasic et al. | |
| 6,661,593 B2 | 12/2003 | Ashikaga et al. | |

OTHER PUBLICATIONS

Hang Nguyen, Pierre Duhamel, "Optimal Soft-Output Viterbi Algorithm", 3rd International Conference on Networking (ICN 04), Mar. 2004.
E. Yeo, S. Augsburger, W. Davis, B. Nikolic, "A 500-Mb/s Soft-Output Viterbi Decoder", IEEE Journal of Solid-State Circuits, vol. 38, No. 7, Jul. 2003.
Ali Ghrayeb, C. X. Huang, "Improvements in SOVA-Based Decoding for Turbo-Coded Storage Channels", IEEE Transactions on Magnetics, vol. 41, No. 12, Dec. 2005.
Roger Wood, "Turbo-PRML: A Compromise EPRML Detector", IEEE Transactions on Magnetics, vol. 29, No. 6, Nov. 1993.

* cited by examiner

*Primary Examiner*—K. Wong
(74) *Attorney, Agent, or Firm*—Howard H. Sheerin, Esq.

(57) ABSTRACT

A disk drive is disclosed comprising a head actuated over a disk having a plurality of servo tracks, wherein each servo track comprises a plurality of servo sectors and each servo sector comprises a track address. A read signal from the head representing a first track address in one of the servo sectors is processed in order to generate a detected track address which is compared to a first target track address to obtain a first track address error. A correction metric is generated representing a likelihood that the first track address error was caused by a detection error, and if the correction metric exceeds a threshold, the detected track address is corrected in response to the first track address error, and the write operation is continued. If the correction metric does not exceed the threshold, the write operation is aborted.

18 Claims, 9 Drawing Sheets

DISK DRIVE CORRECTING TRACK ADDRESS DURING A WRITE OPERATION

BACKGROUND OF THE INVENTION

1. Field of the Invention

The present invention relates to disk drives for computer systems. More particularly, the present invention relates to a disk drive correcting a track address during a write operation.

2. Description of the Prior Art

Disk drives for computer systems typically comprise a disk rotated by a spindle motor with a head actuated over the disk in order to access data recorded in concentric tracks. The head is coupled to a distal end of an actuator arm which is rotated about a pivot by a voice coil motor (VCM) in order to seek the head to a target track, and then maintain the head over the track (tracking) while performing read or write operations. The position information for servoing the head comes from servo sectors recorded at periodic intervals around the circumference of the tracks. The servo sectors typically comprise coarse position information in the form of a digital track address, and fine position information in the form of servo bursts recorded at precise offsets relative to the centerline of each track.

FIG. 1 shows a prior art format of a disk 2 comprising a plurality of concentric tracks 4 having embedded servo sectors $6_0$-$6_N$. Each servo sector (e.g., servo sector $6_4$) comprises a preamble 8 for synchronizing gain control and timing recovery, a sync mark 10 for synchronizing to a data field 12 comprising the coarse head positioning information (such as a digital track address), and servo bursts 14 which provide fine head positioning information. If during a write operation the track address detected from the read signal does not match the track address of the target track, the write operation is typically aborted so that data is not written on the wrong track. After aborting the write operation, the control circuitry will typically "slip" a revolution and attempt to re-execute the write operation.

In some cases, during a write operation the head may actually be over the correct target track but the wrong track address is detected from the read signal due to a detection error (due, for example, to an insufficient signal to noise ratio) rather than from the head being over the wrong track. Aborting the write operation in these cases decreases the throughput of the disk drive due to the latency caused by slipping revolutions and re-executing the write operations.

There is, therefore, a need to increase the throughput of a disk drive by reducing the number of aborted write operations.

SUMMARY OF THE INVENTION

An embodiment of the present invention comprises a disk drive including a disk having a plurality of servo tracks, wherein each servo track comprises a plurality of servo sectors and each servo sector comprises a track address identifying the servo track. The disk drive further comprises a head actuated over the disk, and control circuitry operable to execute a write operation. A read signal from the head representing a first track address in one of the servo sectors is processed in order to generate a detected track address which is compared to a first target track address to obtain a first track address error. A correction metric is generated representing a likelihood that the first track address error was caused by a detection error, and if the correction metric exceeds a threshold, the detected track address is corrected in response to the first track address error, and the write operation is continued. If the correction metric does not exceed the threshold, the write operation is aborted.

In one embodiment, the control circuitry comprises a read channel operable to generate the detected track address, wherein the read channel is further operable to generate a reliability metric for each bit in the detected track address, and the correction metric is based at least partially on at least one of the reliability metrics. In one embodiment, the read channel comprises a sequence detector operable to generate the detected track address and the reliability metrics, and in another embodiment, the read channel comprises a slicer operable to generate the detected track address and the reliability metrics.

In yet another embodiment, the read channel comprises a sequence detector operable to generate the detected track address, the sequence detector comprises a plurality of error events, and the correction metric is based at least partially on the plurality of error events. In one embodiment, the sequence detector comprises a plurality of error event filters for detecting potential error events in response to read signal sample values and expected sample values, and the correction metric is based at least partially on the error event filters.

In still another embodiment, the control circuitry is further operable to compare the detected track address to a second target track address to obtain a second track address error. In one embodiment, the control circuitry is further operable to select between the first and second track address errors based on the number of error bits in each of the track address errors, and correct the detected track address in response to the selected track address error if the correction metric exceeds the threshold.

In another embodiment, the control circuitry is further operable to abort the write operation if the number of error bits in the first track address error exceeds an error threshold.

Another embodiment of the present invention comprises a method of performing a write operation in a disk drive, the disk drive comprising a disk having a plurality of servo tracks, wherein each servo track comprises a plurality of servo sectors and each servo sector comprises a track address identifying the servo track. The disk drive further comprises a head actuated over the disk. A read signal from the head representing a first track address in one of the servo sectors is processed in order to generate a detected track address which is compared to a first target track address to obtain a first track address error. A correction metric is generated representing a likelihood that the first track address error was caused by a detection error, and if the correction metric exceeds a threshold, the detected track address is corrected in response to the first track address error, and the write operation is continued. If the correction metric does not exceed the threshold, the write operation is aborted.

DESCRIPTION OF THE PREFERRED EMBODIMENTS

Figure 2A:
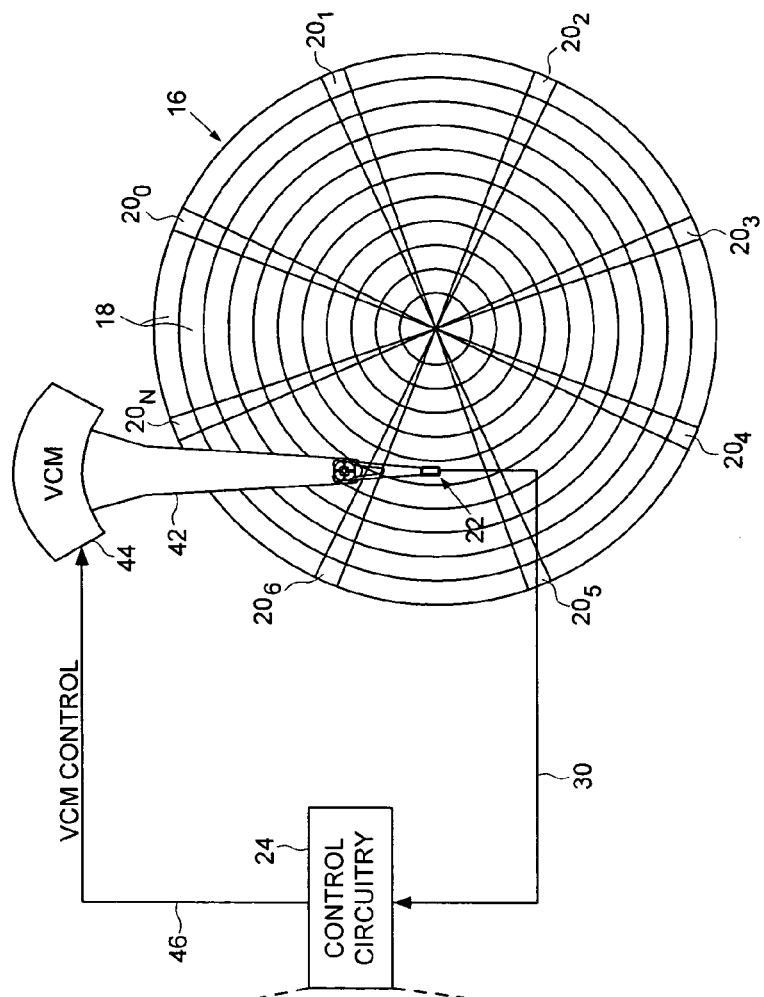
FIG. 2A shows a disk drive according to an embodiment of the present invention including control circuitry for executing a write operation.

FIG. 2A shows a disk drive according to an embodiment of the present invention including a disk 16 having a plurality of servo tracks 18, wherein each servo track 18 comprises a plurality of servo sectors $20_0$-$20_N$, and each servo sector $20_i$ comprises a track address identifying the servo track. The disk drive further comprises a head 22 actuated over the disk 16, and control circuitry 24 operable to execute a write operation by executing the flow diagram of FIG. 2B. At step 26 the control circuitry 24 seeks the head 22 to a target track, and at step 28 processes a read signal 30 from the head 22 representing a first track address in one of the servo sectors $20_i$ in order to generate a detected track address which is compared at step 32 to a first target track address to obtain a first track address error. If at step 34 the first track address error is detected, at step 36 a correction metric is generated representing a likelihood that the first track address error was caused by a detection error, and if at step 38 the correction metric exceeds a threshold, the detected track address is corrected at step 40 in response to the first track address error, and the write operation is continued. If at step 38 the correction metric does not exceed the threshold, the write operation is aborted. The correction metric may be generated at any suitable time, for example, at step 28 concurrent with processing the read signal to generate the detected track address.

In the embodiment of FIG. 2A, the head 22 is coupled to a distal end of an actuator arm 42 which is rotated about a pivot by a voice coil motor (VCM) 44 in order to position the head 22 radially over the disk 16. The control circuitry 24 generates a VCM control signal 46 applied to the VCM 44 in response to the position information detected in the servo sectors $20_0$-$20_N$ (track addresses and servo bursts). If during a write operation the control circuitry 24 corrects an error in the detected track address, the VCM control signal 46 is generated in response to the servo bursts, and the write operation continues rather than abort the write operation as in the prior art.

Figure 3:
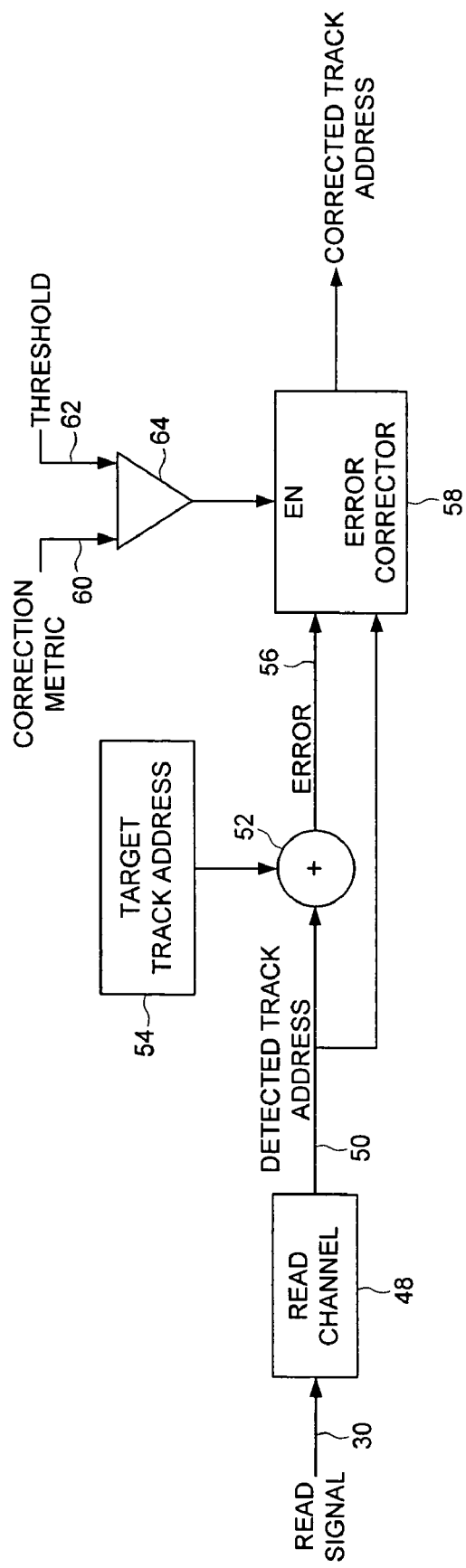
FIG. 3 shows an example embodiment of control circuitry including a read channel for detecting the track address, a comparator for comparing the detected track address to a target track address, and an error corrector for correcting the detected track address if the correction metric exceeds the threshold.
Figure 4:
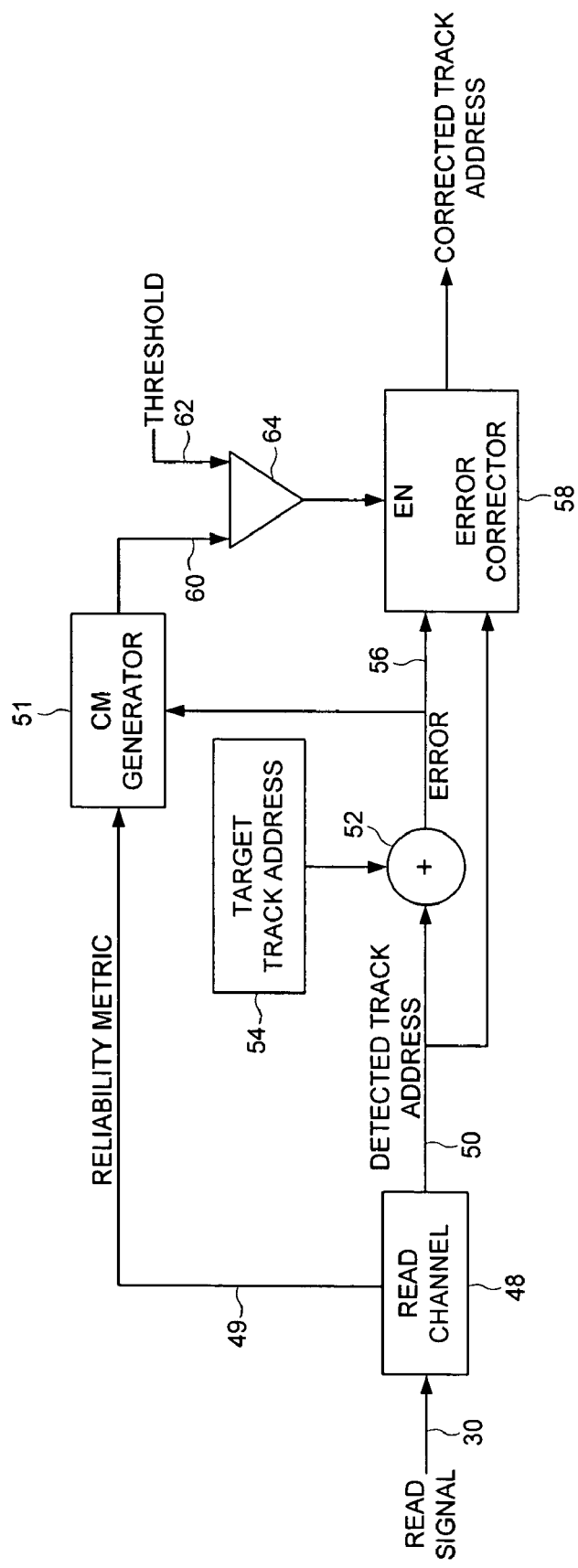
FIG. 4 shows an embodiment of the present invention wherein the read channel generates a reliability metric for each bit in the detected track address, wherein the correction metric is based at least partially on the reliability metrics.

FIG. 3 shows an example embodiment of control circuitry including a read channel 48 for processing the read signal 30 to generate the detected track address 50, and a comparator circuit 52 (e.g., XOR circuit) for comparing the detected track address 50 to a target track address 54 to generate the track address error 56. As described herein, a track address error 56 occurs whenever the bits of the detected track address 50 are not identical to the bits comprising the target track address 54. An error corrector 58 corrects the detected track address 50 in response to the track address error 56 if the correction metric 60 exceeds a threshold 62, as determined at comparator 64. Any suitable correction metric 60 representative of the likelihood that the first track address error 56 was caused by a detection error may be employed in the embodiments of the present invention. In an embodiment shown in FIG. 4, the read channel 48 generates a reliability metric 49 for each bit in the detected track address, and a correction metric generator 51 generates the correction metric 60 based at least partially on at least one of the reliability metrics 49. In one embodiment, the correction metric generator 51 evaluates the reliability metrics 49 for each error bit in the track address error 56, for example, by generating the correction metric 60 as the average of the reliability metrics 49 for each error bit. Alternatively, the correction metric generator 51 may compare the reliability metric 49 to an error bit threshold for each error bit (using, e.g., multiple comparators). The correction metric generator 51 may return a binary correction metric 60 to the error corrector 58 based upon the output of the comparators, wherein the error corrector 58 is enabled if all (or a predetermined subset) of the reliability metrics 49 exceeds the error bit threshold.

Figure 1:
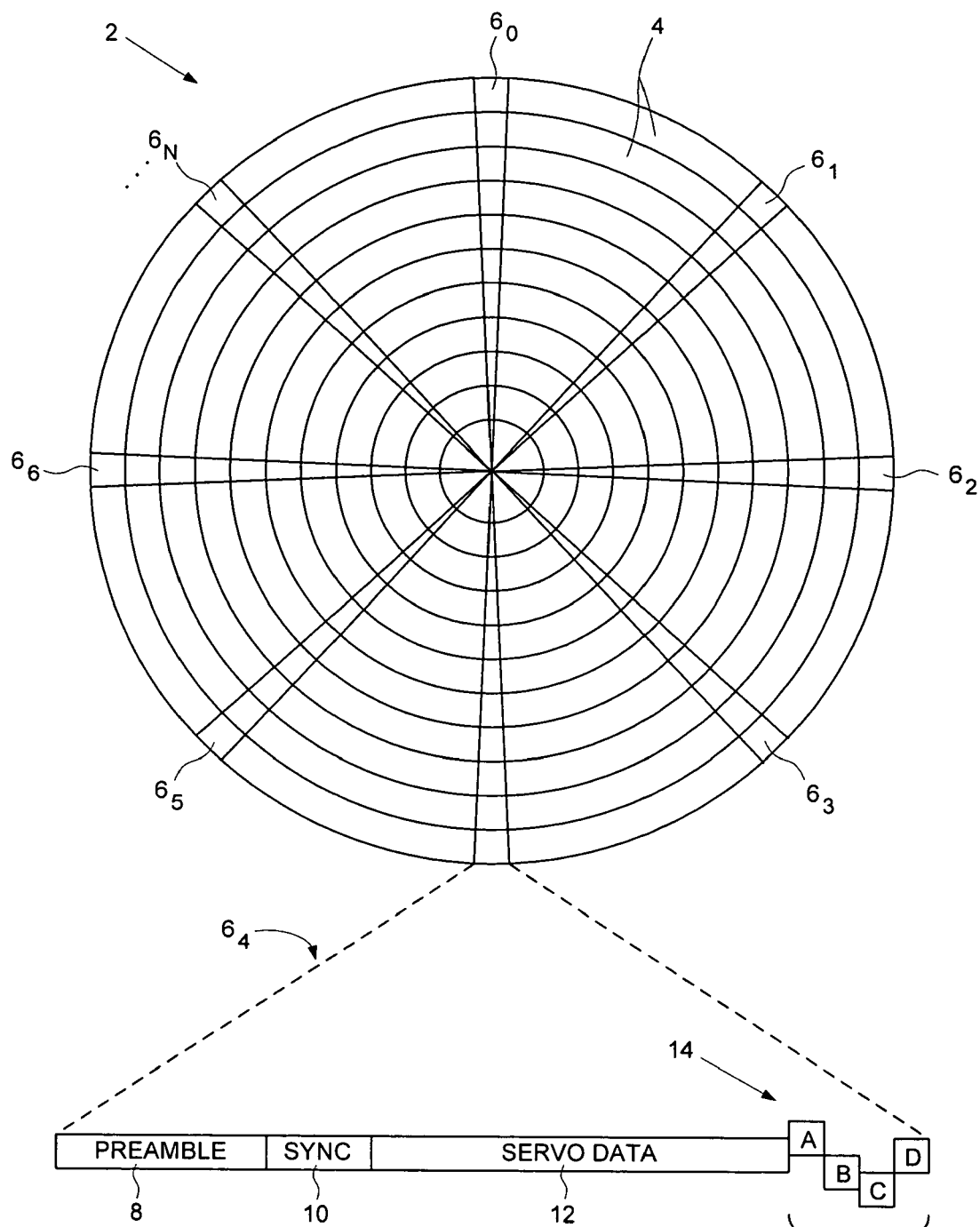
FIG. 1 shows a prior art disk format including a plurality of servo tracks, wherein each servo track comprises a plurality of embedded servo sectors.

The threshold 62 may represent an upper limit or a lower limit depending on whether a high probability of a detection error (indicated by the correction metric 60) is represented by a high value or a low value. Any suitable value may be assigned to the threshold 62, wherein different values of the threshold affect the probability of either correcting a track address error or aborting the write operation at step 38 of FIG. 1. In other embodiments, the correction metric 60 may be generated as a binary signal (0 or 1), in which case the correction metric 60 enables the error corrector 58 directly without needing a comparator 64.

Figure 5A:
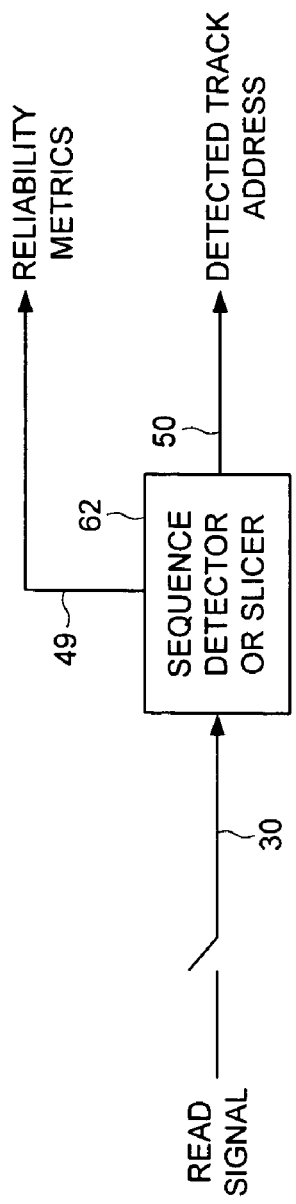
FIG. 5A shows an embodiment of the present invention wherein the read channel comprises a sequence detector or a slicer for generating the reliability metrics.

The read channel 48 may generate any suitable reliability metric 49 in the embodiments of the present invention. FIG. 5A shows an embodiment of the present invention wherein the read channel comprises a sequence detector or slicer 62 for generating the detected track address as well as the reliability metrics 49. A slicer detects each bit in the track address by comparing a read signal sample value to a predetermined target threshold, wherein the reliability metric 49 is generated relative to a difference between the read signal sample value and the target threshold.

In the embodiment wherein the read channel 48 comprises a sequence detector, the reliability metrics 49 are generated relative to the difference between path metrics for each possible survivor sequence through the corresponding trellis. Mathematically, the reliability metric 49 for each detected bit can be represented as the log-likelihood ratio:

$$\lambda(\hat{u}_i = u/Y) = \ln \frac{\sum_{U \in S_u/u_i=u} P(U/Y)}{\sum_{U \in S_u/u_i \neq u} P(U/Y)}$$

where $\hat{u}_i$ is the detected bit in the binary sequence u, $S_u$ is the set of all possible sequences U associated with all the possible paths through the trellis, and Y is the received sequence of read signal sample values. The reliability metrics are theoretically computable using the above equation, but the computation becomes exponentially complex with the length of the detected sequence. In one embodiment, the reliability metrics are approximated to reduce the complexity, such as disclosed in prior art soft-output Viterbi algorithm (SOVA) references including "Optimal Soft-Output Viterbi Algorithm" by Hang Nguyan and Pierre Duhamel, $3^{rd}$ International Conference on Networking, March 2004, the disclosure of which is incorporated herein by reference. The complexity of computing the reliability metrics may also be reduced by encoding the track addresses using a constrained code which reduces the number of possible paths through the trellis. In yet other embodiments, the computation of the reliability metrics may be simplified using other approximation techniques, for example, by evaluating the path metrics associated with the dominant error events of the sequence detector.

Figure 5B:
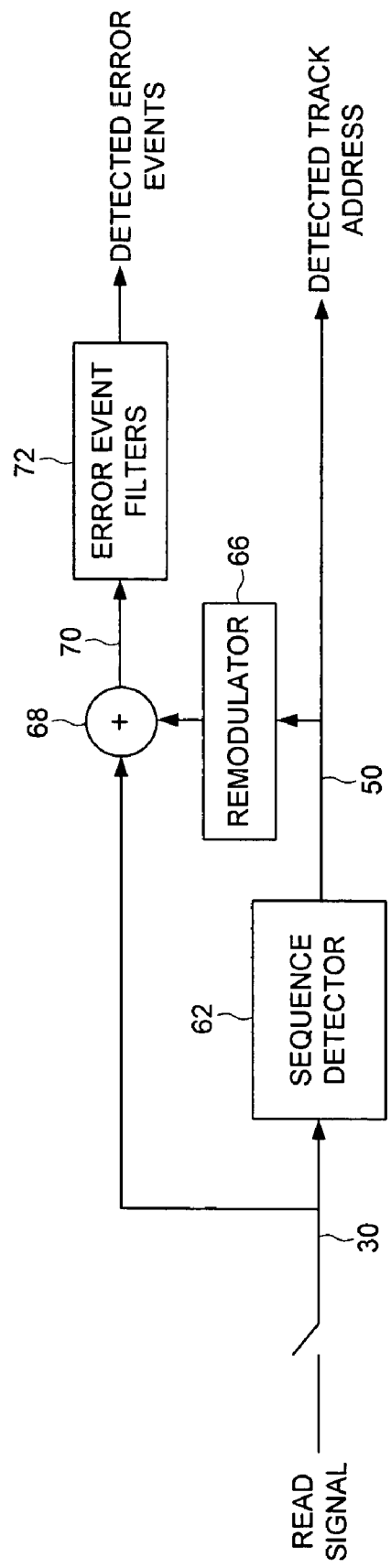
FIG. 5B shows another embodiment of the present invention wherein the read channel comprises a sequence detector and a plurality of error event filters for detecting sequence detector error events.

FIG. 5B shows an embodiment of the present invention wherein the read channel comprises a sequence detector 62 operable to generate the detected track address 50, and the sequence detector 62 comprises a plurality of error events. For example, a minimum distance error event occurs when paths diverge and remerge in the corresponding trellis, wherein the shortest minimum distance error events (shortest paths) are typically the dominant error events. The read channel further comprises post processing circuitry for detecting the occurrence of an error event, including a remodulator 66 for remodulating the bits of the detected track address 50 into ideal sample values which are subtracted 68 from the read signal sample values 30 to generate a sequence of error values 70. The error values 70 are filtered by a plurality of error event filters 72 each corresponding to a particular error event of the sequence detector 62. The error event filters 72 may be implemented in any suitable manner, an example of which is disclosed in "Turbo-PRML: A Compromise EPRML Detector" by Roger Wood, IEEE Transactions on Magnetics, Vol. 29, No. 6, November 1993, the disclosure of which is incorporated herein by reference.

Figure 6:
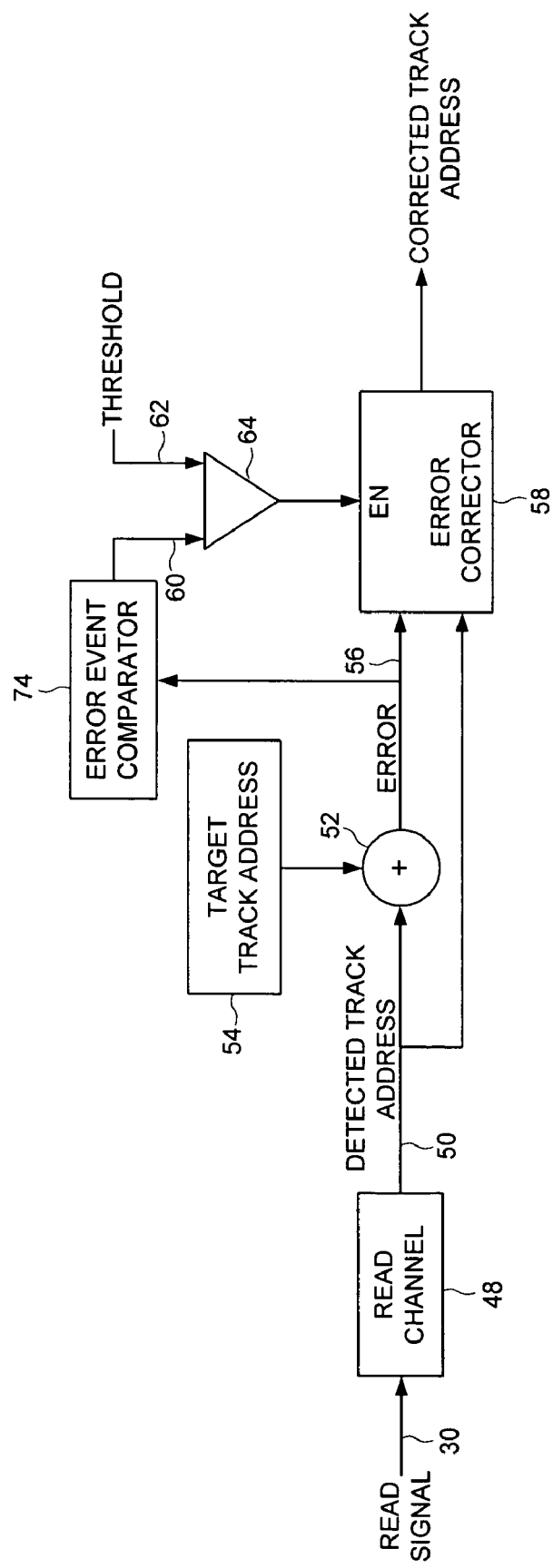
FIG. 6 shows an embodiment of the present invention wherein the correction metric is generated in response to the sequence detector error events.
Figure 7:
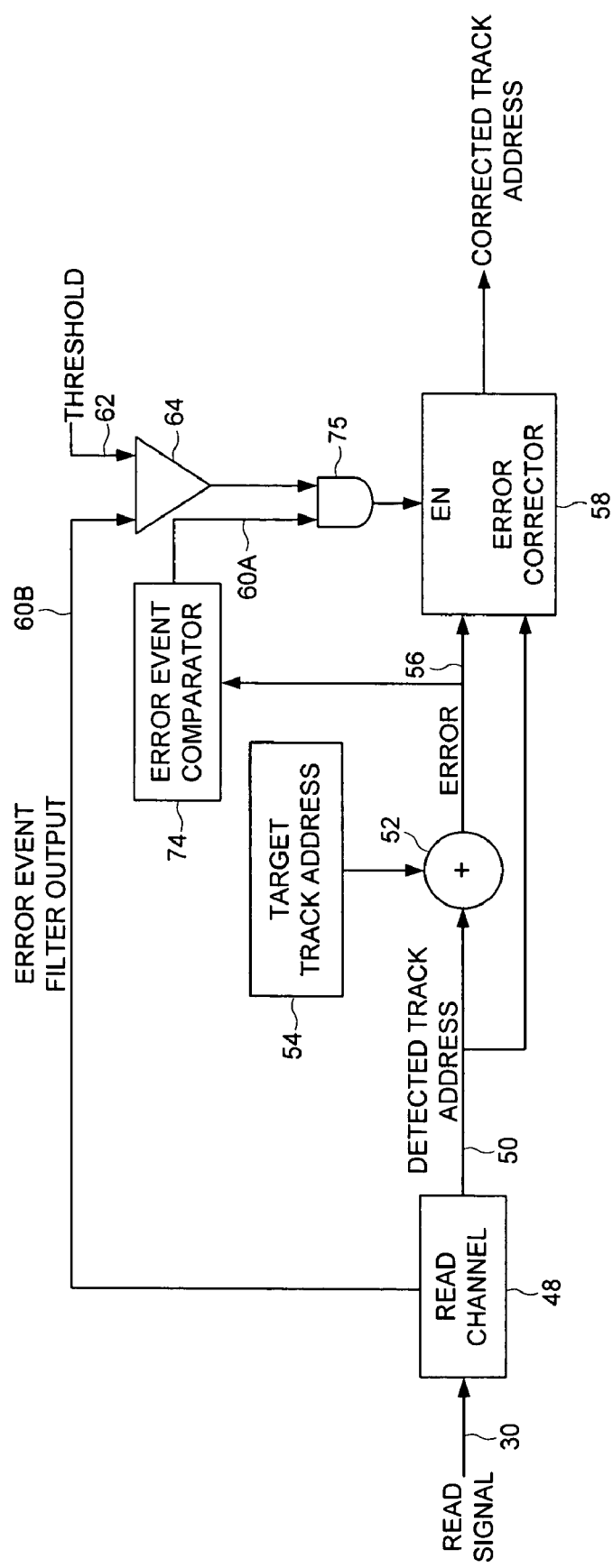
FIG. 7 shows an embodiment of the present invention wherein the correction metric is generated in response to the sequence detector error events as well as the output of the error event filters.

FIG. 6 shows an embodiment of the present invention wherein the correction metric is generated in response to the error events of the sequence detector 62. An error event comparator 74 compares the bit sequence of the track address error 56 to the bit sequence of the possible sequence detector error events to determine the likelihood that a detection error occurred. If the track address error 56 is consistent with a sequence detector error event, the correction metric 60 is set to exceed the threshold 62 so that the detected track address 50 is corrected by the error corrector 58 (or alternatively the correction metric 60 is generated as a binary signal which enables the error corrector 58 directly). In an alternative embodiment shown in FIG. 7, the detected track address 50 is corrected if the track address error 56 is consistent with a sequence detector error event at the output 60A of comparator 74, and 75 the output 60B of the error event filters 72 (FIG. 5B) exceeds a predetermined threshold 62 further indicating the likelihood that an error event occurred.

Figure 8:
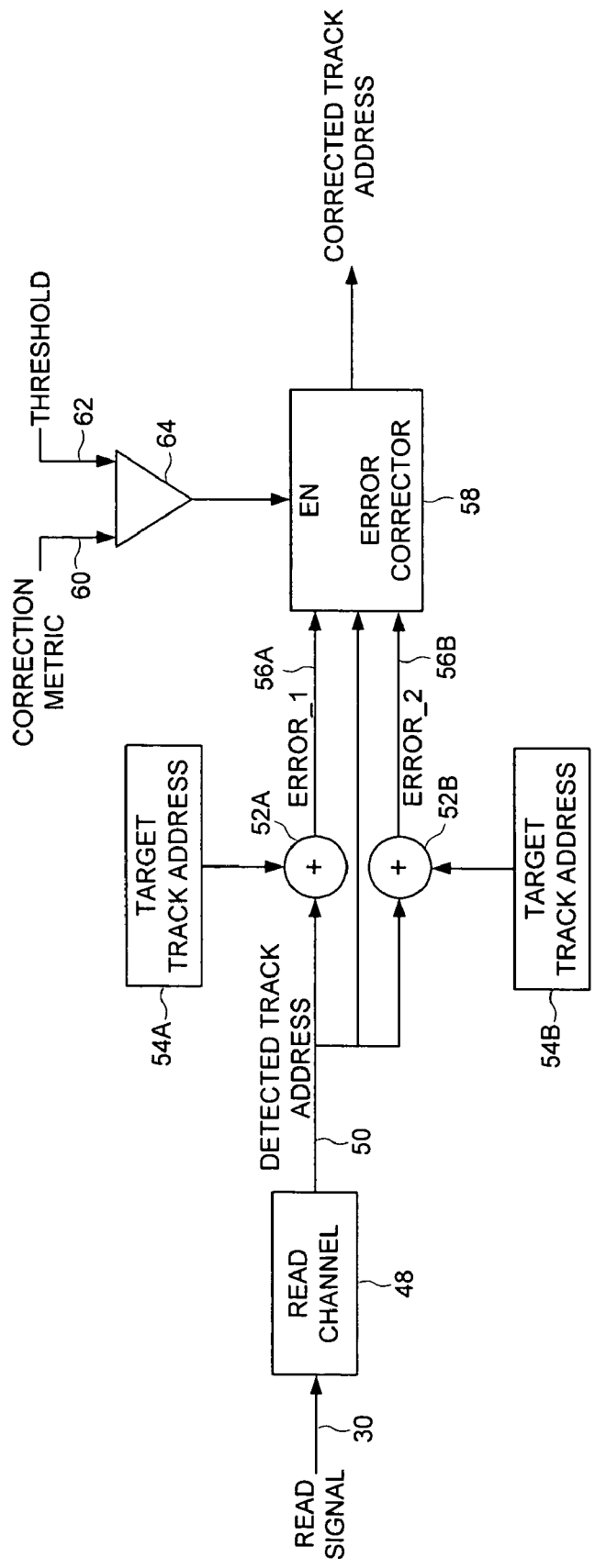
FIG. 8 shows an embodiment of the present invention wherein the control circuitry compares the detected track address to two target track addresses, and then selects one of the track address errors to correct.

In one embodiment, the data track density matches the servo track density such that the centerline of each data track corresponds to the centerline of a servo track. In an alternative embodiment, the data track density is greater than the servo track density such that the centerline of a data track may be aligned between two servo tracks. Accordingly, one of two track addresses may be detected while tracking the centerline of a data track during a write operation. FIG. 8 shows an embodiment of the present invention wherein the detected track address 50 is compared to first and second target track addresses 54A and 54B to generate first and second track address errors 56A and 56B. If either track address error 56A or 56B is zero, the detected track address is not corrected. If both track address errors 56A and 56B are non-zero, the error corrector 58 selects one of the track address errors to correct. For example, the track address error comprising the least number of error bits is selected by the error corrector in one embodiment. As discussed above, the selected track address error may then be corrected based on the correction metric 60 associated with that track address error.

Figure 2B:
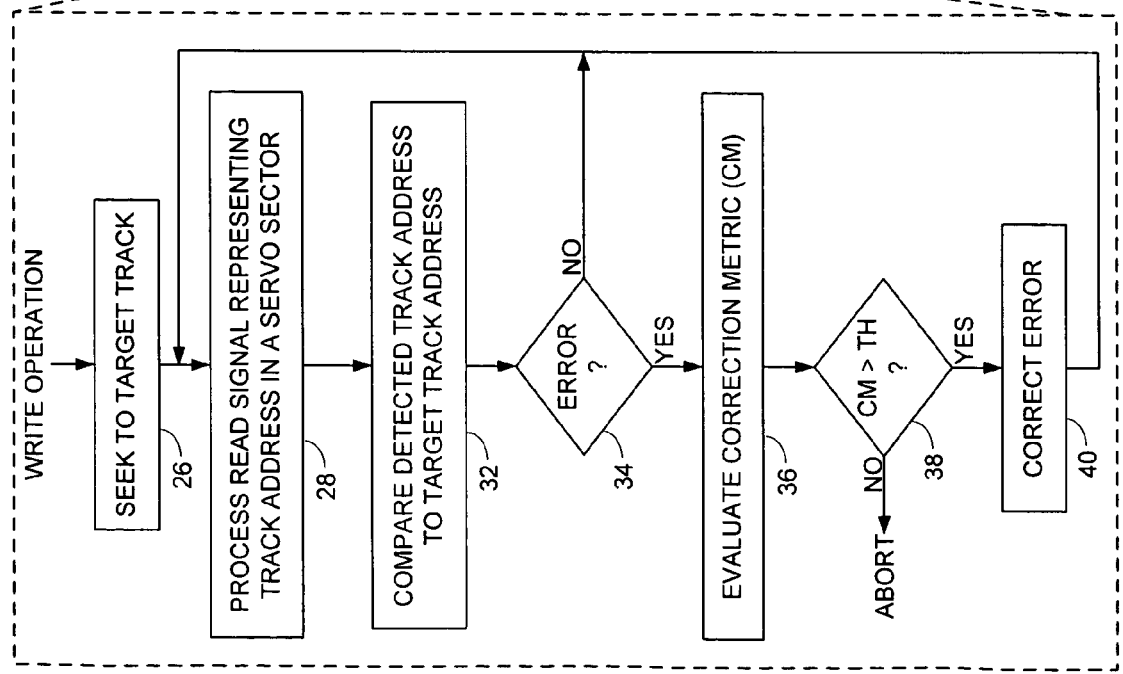
FIG. 2B is a flow diagram executed by the control circuitry to execute a write operation by correcting a detected track address if a correction metric exceeds a threshold.
Figure 9:
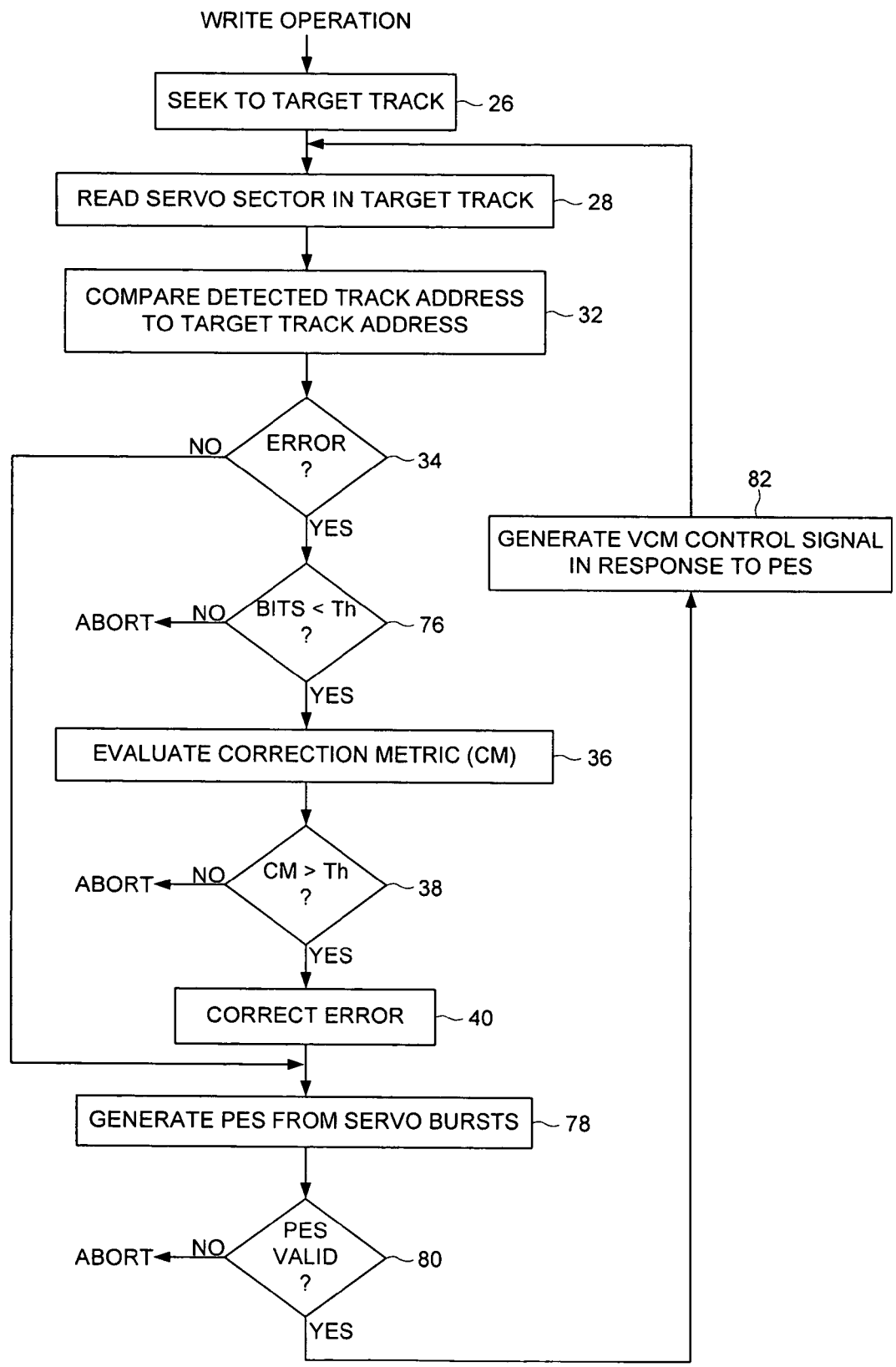
FIG. 9 shows a flow diagram according to an embodiment of the present invention wherein the write operation is aborted if the number of error bits in the track address error exceeds a threshold, or if the position error signal (PES) generated from the servo bursts is invalid.

FIG. 9 is a more detailed flow diagram according to an embodiment of the present invention, and is an extension of the flow diagram of FIG. 2B. If a track address error is detected at step 34, at step 76 the number of error bits in the track address error is compared to an error threshold. If the number of error bits exceeds the error threshold at step 76, then the write operation is aborted regardless of the correction metric. This embodiment helps ensure the detected track address is corrected due to a detection error rather than due to the head being over the wrong track. If at step 40 the detected track address is corrected, then at step 78 a position error signal (PES) is generated in response to the servo bursts within the servo sector and evaluated at step 80. If the PES appears to be invalid (due to the head being too far off track or over the wrong track), then the write operation is aborted. If the PES is valid at step 80, then at step 82 the control circuitry 24 generates the VCM control signal 46 in response to the PES and the write operation continues.

In one embodiment, if a write operation is aborted the control circuitry 24 immediately re-executes the write operation after slipping a disk revolution. In another embodiment, the control circuitry 24 inserts the aborted write operation into a queue and then re-executes the aborted write operation in an order determined from a rotational position optimization (RPO) algorithm. In yet another embodiment, if a write operation is aborted after an initial portion of the write operation has been completed, only the remaining part of the write operation is re-executed in order to write the remaining data sectors to the disk.

The various components in the embodiments of the present invention may operate in any suitable manner. For example, the error corrector 58 (FIG. 3) may correct the detected track address in a number of different ways. In one embodiment, the error corrector 58 XORs the track address error 56 with the detected track address 50 to generate the corrected track address. In another embodiment, the error corrector 58 simply outputs the target track address 54 as the corrected track address when the correction metric 60 exceeds the threshold 62.

Any suitable control circuitry 24 may be employed in the embodiments of the present invention, such as a separate read channel integrated circuit or a read channel implemented in a system on a chip (SOC). Alternatively, the control circuitry 24 may be implemented by a component separate from the read channel, such as a disk controller, or certain steps described above may be performed by the read channel and others by the disk controller. In one embodiment, the control circuitry 24 comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a system on a chip (SOC). In another embodiment, the instructions are stored on the disk 16 and read into a volatile semiconductor memory when the disk drive is powered on. In yet another embodiment, the control circuitry 24 comprises suitable logic circuitry, such as state machine circuitry.

We claim:

1. A disk drive comprising:
   (a) a disk comprising a plurality of servo tracks, wherein each servo track comprises a plurality of servo sectors and each servo sector comprises a track address identifying the servo track;
   (b) a head actuated over the disk; and
   (c) control circuitry operable to execute a write operation by:
   processing a read signal from the head representing a first track address in one of the servo sectors in order to generate a detected track address;
   comparing the detected track address to a first target track address to obtain a first track address error;
   generating a correction metric representing a likelihood that the first track address error was caused by a detection error;
   if the correction metric exceeds a threshold, correcting the detected track address in response to the first track address error and continuing with the write operation; and
   if the correction metric does not exceed the threshold, aborting the write operation.

2. The disk drive recited in claim 1, wherein:
   (a) the control circuitry comprises a read channel operable to generate the detected track address;
   (b) the read channel is further operable to generate a reliability metric for each bit in the detected track address; and
   (c) the correction metric is based at least partially on at least one of the reliability metrics.

3. The disk drive recited in claim 2, wherein the read channel comprises a sequence detector operable to generate the detected track address and the reliability metrics.

4. The disk drive recited in claim 2, wherein the read channel comprises a slicer operable to generate the detected track address and the reliability metrics.

5. The disk drive recited in claim 1, wherein:
   (a) the read channel comprises a sequence detector operable to generate the detected track address;
   (b) the sequence detector comprises a plurality of error events; and
   (c) the correction metric is based at least partially on the plurality of error events.

6. The disk drive recited in claim 5, wherein:
   (a) the sequence detector comprises a plurality of error event filters for detecting potential error events in response to read signal sample values and expected sample values; and
   (b) the correction metric is based at least partially on the error event filters.

7. The disk drive recited in claim 1, wherein the control circuitry is further operable to compare the detected track address to a second target track address to obtain a second track address error.

8. The disk drive recited in claim 7, wherein the control circuitry is further operable to:
   (a) select between the first and second track address errors based on the number of error bits in each of the track address errors; and
   (b) correct the detected track address in response to the selected track address error if the correction metric exceeds the threshold.

9. The disk drive recited in claim 1, wherein the control circuitry is further operable to abort the write operation if the number of error bits in the first track address error exceeds an error threshold.

10. A method of performing a write operation in a disk drive, the disk drive comprising a disk having a plurality of servo tracks, wherein each servo track comprises a plurality of servo sectors and each servo sector comprises a track address identifying the servo track, and a head actuated over the disk, the method comprising:
    processing a read signal from the head representing a first track address in one of the servo sectors in order to generate a detected track address;
    comparing the detected track address to a first target track address to obtain a first track address error;
    generating a correction metric representing a likelihood that the first track address error was caused by a detection error;
    if the correction metric exceeds a threshold, correcting the detected track address in response to the first track address error and continuing with the write operation; and
    if the correction metric does not exceed the threshold, aborting the write operation.

11. The method recited in claim 10, wherein generating the correction metric comprises generating a reliability metric for each bit in the detected track address.

12. The method recited in claim 11, wherein a sequence detector generates the detected track address and the reliability metrics.

13. The method recited in claim 11, wherein a slicer generates the detected track address and the reliability metrics.

14. The method recited in claim 10, wherein the correction metric is generated in response to a plurality of error events of a sequence detector.

15. The method recited in claim 14, wherein the correction metric is generated in response to a plurality of error event filters for detecting potential error events in response to read signal sample values and expected sample values.

16. The method recited in claim 10, further comprising comparing the detected track address to a second target track address to obtain a second track address error.

17. The method recited in claim 16, further comprising:
    selecting between the first and second track address errors based on the number of error bits in each of the track address errors; and
    correcting the detected track address in response to the selected track address error if the correction metric exceeds the threshold.

18. The method recited in claim 10, further comprising aborting the write operation if the number of error bits in the first track address error exceeds an error threshold.

* * * * *